US010626561B2

(12) United States Patent
Riccobene, Jr. et al.

(10) Patent No.: US 10,626,561 B2
(45) Date of Patent: Apr. 21, 2020

(54) PERMEABLE JOINT FOR PAVER AND STRUCTURAL SYSTEM THEREFOR

(71) Applicant: Riccobene Designs LLC, Albuquerque, NM (US)

(72) Inventors: Thomas S. Riccobene, Jr., Los Ranchos, NM (US); Dominic T. Riccobene, Los Ranchos, NM (US)

(73) Assignee: RICCOBENE DESIGNS LLC, Albuquerque, NM (US)

( * ) Notice: Subject to any disclaimer, the term of this patent is extended or adjusted under 35 U.S.C. 154(b) by 0 days.

(21) Appl. No.: 16/353,205

(22) Filed: Mar. 14, 2019

(65) Prior Publication Data

US 2019/0323178 A1    Oct. 24, 2019

Related U.S. Application Data

(60) Provisional application No. 62/660,033, filed on Apr. 19, 2018.

(51) Int. Cl.
*E01C 5/00* (2006.01)
*E01C 11/02* (2006.01)
(Continued)

(52) U.S. Cl.
CPC .............. *E01C 11/02* (2013.01); *E01C 5/003* (2013.01); *E01C 19/52* (2013.01); *E01C 5/02* (2013.01);
(Continued)

(58) Field of Classification Search
CPC . E01C 5/00; E01C 5/003; E01C 11/02; E01C 2201/20; E04F 17/023
(Continued)

(56) References Cited

U.S. PATENT DOCUMENTS 1,348,959 A * 8/1920 Rhodes ................... E01C 5/003
404/34
2,253,513 A * 8/1941 Fischer ................. E01C 11/106
404/65
(Continued)

FOREIGN PATENT DOCUMENTS

DE      19537823 A1 *  4/1997  ............ E01C 11/225
EP       1484295 A1 * 12/2004  ............ C04B 18/24
EP       1985758 A1    10/2008

OTHER PUBLICATIONS

Rompox—Flex Joint product sheet, 2 pages (Year: 2017).*
Rompox—Flex Joint with Wayback Machine date (Year: 2017).*

*Primary Examiner* — Thomas B Will
*Assistant Examiner* — Katherine J Chu
(74) *Attorney, Agent, or Firm* — Greer, Burns & Crain, Ltd.

(57) ABSTRACT

A structural system that includes at least two pavers partially defining a paved surface, the pavers partially defining a void between them. The system also includes a permeable joint located in the void between the pavers, where the permeable joint also partially defines the paved surface. The permeable joint includes a base layer formed of aggregate and bonded together with a non-cement binder, and a membrane layer formed of aggregate that is sized smaller than the aggregate of the base layer, where the aggregate of the membrane is also bonded together with a non-cement binder. The membrane is less permeable than the base layer and is located above the base layer.

19 Claims, 1 Drawing Sheet

(51) Int. Cl.
*E01C 19/52* (2006.01)
*E01C 5/02* (2006.01)
*E01C 5/04* (2006.01)
*E04F 17/00* (2006.01)
*E01C 5/18* (2006.01)
*E01C 15/00* (2006.01)
*E04H 5/02* (2006.01)
*E01C 5/14* (2006.01)

(52) U.S. Cl.
CPC .................. *E01C 5/04* (2013.01); *E01C 5/14* (2013.01); *E01C 5/18* (2013.01); *E01C 15/00* (2013.01); *E01C 2201/20* (2013.01); *E04F 17/00* (2013.01); *E04H 5/02* (2013.01)

(58) Field of Classification Search
USPC .......................................................... 404/34
See application file for complete search history.

(56) References Cited

U.S. PATENT DOCUMENTS

| | | | | |
|---|---|---|---|---|
| 2,370,647 | A * | 3/1945 | Fischer | E01C 11/106 404/49 |
| 2,431,385 | A * | 11/1947 | Fischer | E01C 11/106 404/49 |
| 3,870,422 | A | 3/1975 | Medico, Jr. | |
| 4,958,964 | A * | 9/1990 | Soto | E01C 5/00 404/40 |
| 5,024,554 | A | 6/1991 | Benneyworth | |
| 5,282,691 | A | 2/1994 | McIntosh et al. | |
| 5,375,940 | A * | 12/1994 | Kobayashi | E01C 11/225 404/2 |
| 5,914,308 | A * | 6/1999 | Morris | C11D 1/662 510/224 |
| 5,957,619 | A * | 9/1999 | Kinoshita | E01C 5/003 404/31 |
| 6,146,051 | A | 11/2000 | Pratt | |
| 8,142,101 | B2 * | 3/2012 | Kaul | E01C 7/085 404/31 |
| 8,221,831 | B2 * | 7/2012 | Riehm | C04B 26/28 106/15.05 |
| 8,297,874 | B2 * | 10/2012 | Krzyzak | E01C 1/002 404/31 |
| 8,662,787 | B2 | 3/2014 | Sawyer et al. | |
| 9,016,978 | B2 * | 4/2015 | Konczak | E01C 7/187 404/75 |
| 9,523,175 | B2 | 12/2016 | Fritsche | |
| 9,540,776 | B2 * | 1/2017 | von Langsdorff | E01C 11/225 |
| 2006/0056912 | A1 * | 3/2006 | Altmann | E01C 5/06 404/38 |
| 2008/0131203 | A1 * | 6/2008 | Colletti | C04B 26/06 404/73 |
| 2010/0040781 | A1 * | 2/2010 | Cogan | C04B 28/02 427/256 |
| 2011/0064872 | A1 * | 3/2011 | Riehm | C04B 26/28 427/136 |
| 2013/0136534 | A1 * | 5/2013 | von Langsdorff | E01C 11/225 404/2 |
| 2014/0272369 | A1 * | 9/2014 | King | C04B 26/14 428/220 |

* cited by examiner

PERMEABLE JOINT FOR PAVER AND STRUCTURAL SYSTEM THEREFOR

PRIORITY CLAIM

This application claims priority of U.S. Provisional Application Ser. No. 62/660,033, filed Apr. 19, 2018.

FIELD OF THE DISCLOSURE

The present disclosure relates to paver structural systems, and more particularly to permeable joints between individual pavers of the paver structural system. The permeable joint of this invention has particular applicability in paved structural systems forming paved surfaces that are subjected to water or other fluids that are to be drained away from the paved surface.

BACKGROUND OF THE DISCLOSURE

Discrete paving elements ("herein pavers"), such as bricks, stones and tiles are commonly used for outdoor patios, parking lots, cobble stone streets, and similar paved structures. The pavers are usually supported on a substrate layer comprising one or more layers of aggregate or other materials to provide a level surface for the pavers when installed.

Strength of the paver structural system is a design consideration when implementing the system. The paver structural system is subjected to compression loading from both static loading of objects on top of the paved surface and from live loading of pedestrian or vehicular traffic moving across the paved surface. The paver structural system should be strong enough to withstand the anticipated loading.

Reducing surface runoff from paved surfaces is another design consideration. When the paved surfaces receive rain or other fluids, drainage ideally occurs downward through the paver structural system.

Further, the paver structural system is subjected to environmental wear and tear that can impair the ability to drain the fluids, such the deposit of sand, grit, dirt, motor oil, organic soils and roots, dust, debris, etc. onto the paved surface.

Additionally, cement binders are not preferable uses for permeable joint material. Large aggregate sizes are required in permeable mixtures that use cement binders, which are too large for use as a joint material, do not readily flow into small spaces, are easily clogged by debris, and will stain surrounding materials.

Thus the resulting paver structural system, including the joints between the pavers, should be strong enough to withstand the compression loading and be permeable enough to allow for the drainage of fluids, even when subjected to wear and tear. As a result, there is a need for an improved structural system of pavers having a permeable joint that provides compression strength and permeability, as well as protection of the sublayer from clogging debris.

SUMMARY OF THE DISCLOSURE

The above-identified need is met by the present paver structural system having a permeable joint. Specifically, the paver structural system includes at least two pavers partially defining a paved surface, the two pavers partially defining a void between them. The system also includes a permeable joint located in the void between the pavers, where the permeable joint also partially defines the paved surface. The permeable joint includes a base layer formed of aggregate and bonded together with a non-cement binder, and a membrane layer formed of aggregate that is sized smaller than the aggregate of the base layer, where the aggregate of the membrane is also bonded together with a non-cement binder. The membrane layer is less permeable than the base layer and is located above the base layer.

A method of installing the paver structural system having a permeable joint includes the steps of laying at least two pavers on a substrate layer; spacing the pavers from each other in a spaced arrangement forming joint voids between them; forming a first slurry containing aggregate, water and a non-cement binder to form the base layer; applying the base layer of the permeable joint over the paver structural system, and placing the base layer into the joint voids; and curing the base layer for at least 30-minutes. The method further includes the steps of forming a second slurry containing aggregate, water and a non-cement binder to form the membrane layer where the aggregate of the second slurry is smaller than the aggregate of the first slurry; and applying the membrane layer of the permeable joint over the paver structural system, and placing the membrane layer into the joint voids and on top of the base layer.

A permeable joint for a paver structural system having individual pavers that form a paved surface is also provided. The permeable joint includes a base layer having aggregate sized in the range of #4 to #20 ASTM and a two-part permeable epoxy binder having a foaming agent. The permeable joint also includes a membrane layer comprising aggregate sized in the range of #20 to #50 ASTM and the two-part permeable epoxy binder having the foaming agent. The base layer is mixed into a slurry with water and deposited between the individual pavers, and the membrane layer is mixed into a second slurry with water and deposited between the individual pavers and above the base layer.

These and other examples of the present invention are discussed below in the following detailed description of the present invention.

DETAILED DESCRIPTION OF THE PREFERRED EMBODIMENTS

The present disclosure is directed to a paver structural system having a permeable joint. Preferred embodiments of the present disclosure are described below by way of example only, with reference to the accompanying drawings.

Figure 1:
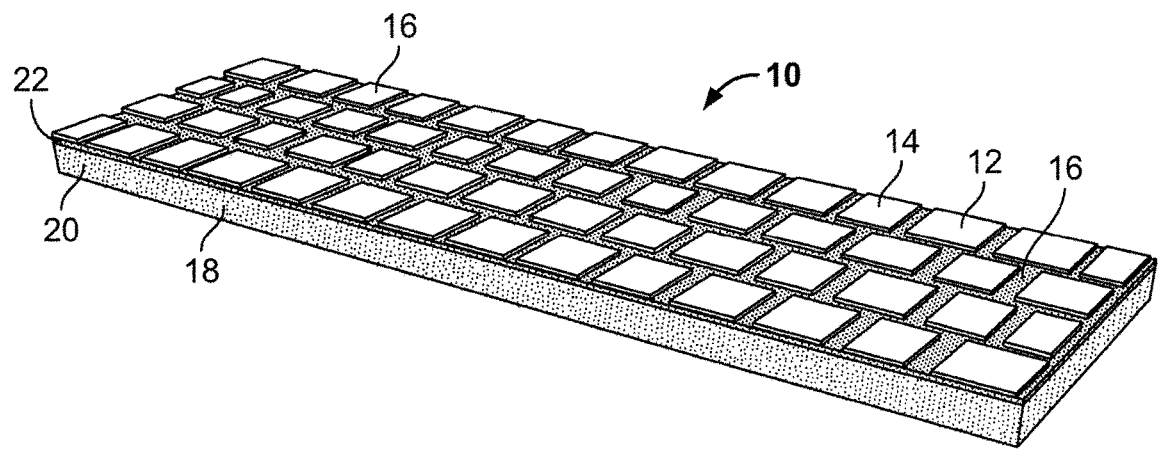
FIG. 1 is a perspective cross-section view of a paver structural system having a permeable joint.
Figure 2:
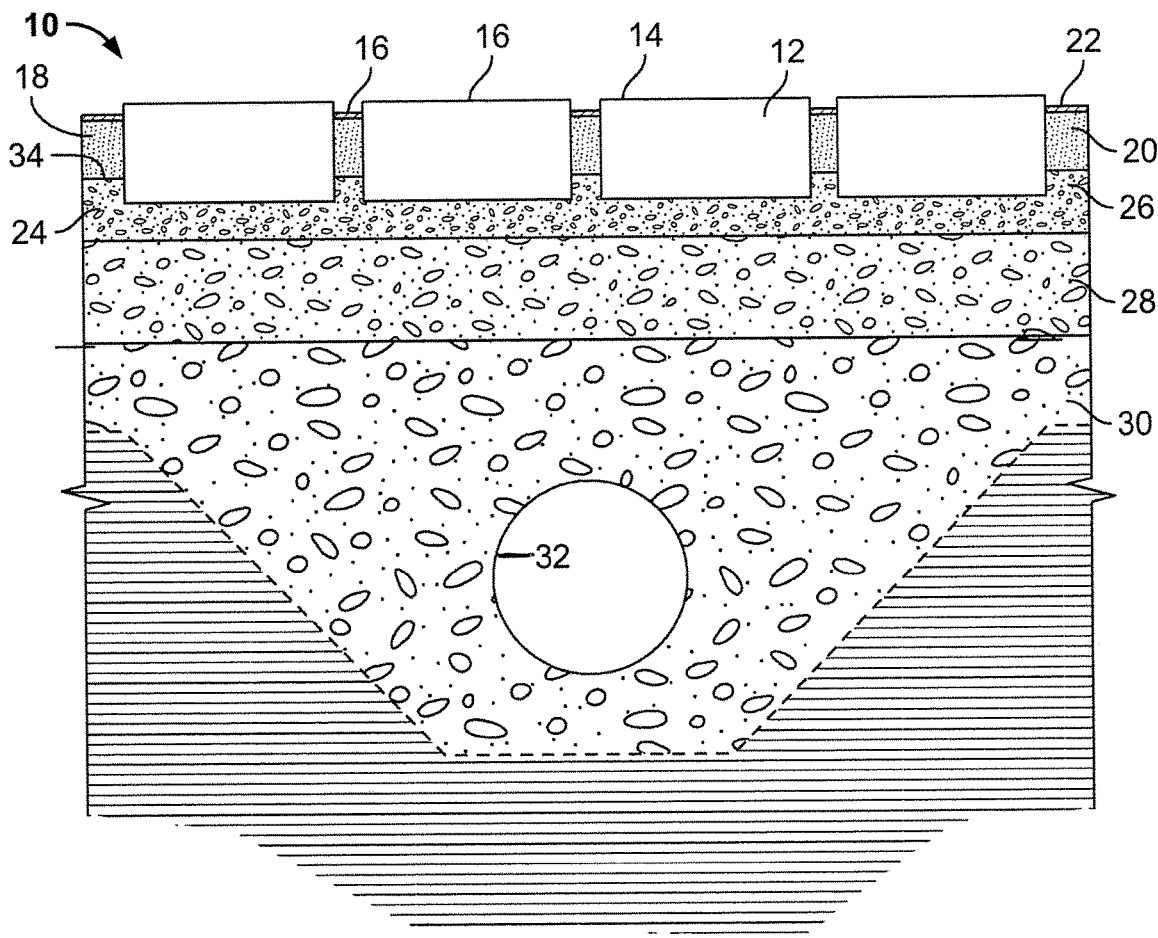
FIG. 2 is a cross-section view of the paver structural system having the permeable joint in situ.

FIGS. 1 and 2 illustrate a paver structural system 10 that includes a plurality of pavers 12 having a top surface 14 that is relatively flat or otherwise suitable for pedestrian traffic or vehicular traffic. The top surfaces 14 of multiple pavers 12 partially define a paved surface 16. The paved surface 16 may be, for example, a patio, a cobble stone road, a sidewalk, a parking lot, or a driveway, among other surfaces. The pavers 12 are pavers for a road, pathway or sidewalk. It is also contemplated that the pavers can be matted or unmated pavers (i.e. the individual cobble pavers are connected to each other with a grid to form an articulating mat of pavers). Other matted or unmated pavers can be used, such as for example, bricks, natural stones, flagstones, river rock, artificial stones, tiles, landscape edgers, and any other paver forming a surface covering, wall or other structure. The paver structural system 10 may alternatively be an interior support system where the pavers 12 may alternatively be rubber or wooden blocks applied in an interior environment, such as is used in factory floor systems. The pavers 12 may be porous to the flow of water or other fluids, or may be impervious. Further, the pavers may have optional features such as drainage channels and tread on the top or bottom surfaces.

As will be discussed in further detail later, between the pavers 12 is a permeable joint 18 having two layers: a base layer 20 and a membrane layer 22. The permeable joint 18 is disposed between pavers 12, and when viewed in cross-section, the membrane layer 22 and the top surface 14 of the paver form the paved surface 16.

The paver structural system 10 rests on a substrate layer 24 which may itself include one or more layers. In the preferred embodiment, the substrate layer 24 includes multiple layers such as an underlayment course 26, a graded course 28 and a base course 30. As illustrated in FIG. 1, the substrate layer 24 may surround a perforated pipe 32 that receives fluid through the permeable joint 18 and through the multiple courses 26, 28, 30, where the perforated pipe 32 transfers the fluid away from the paver structural system 10. The underlayment course 26 is preferably an aggregate layer, but the substrate layer 24 may be formed of various materials such as dirt, sand, clay, concrete, crushed stone, and the like. The substrate layer may further be undisturbed, native soil or may be compacted native soil or may be a graded and/or compacted aggregate.

To implement the paver structural system 10, the pavers 12 are spaced from each other by physical spacers, or spaced apart by hand or other means, from preferably about ⅛-inch to 1-inch apart, and more preferably from about ⅜-inch to ⅝-inch apart for smaller pavers 12, forming an open joint or void for receiving the permeable joint 18. For larger pavers 12, it is contemplated that the pavers be spaced apart as much as 6-inches or more. The pavers 12 are installed above the underlayment course 26, and in the preferred embodiment the pavers are placed or vibrated into the underlayment course using a plate compactor prior to application of the permeable joint 18. In a preferred embodiment, the pavers 12 are recessed into a top surface 34 of the substrate layer 24 at least ¼-inch to ⅜-inch, depending on the size of the paver, to stabilize the paver structural system 10 and prevent the pavers from twisting or rocking, and to reduce any sinking movement due to substrate layer 24 failure. The thickness of the underlayment layer 26 can vary, depending on the particular configuration of the paver structural system 10.

After the pavers 12 are laid-out on the substrate layer 24, the permeable joint 18 is applied. The base layer 20 serves as the structural body of the permeable joint 18 that also provides high permeability. As opposed to a pervious concrete formed of aggregate and cement, the base layer 20 is made up of large aggregates and a non-cement binder (described in more detail below) that form an open-celled matrix that is both permeable and strong to allow water to flow through it and to provide a stable spacer between all pavers 12. An exemplary formula for the base layer 20 is a screened mixture of aggregate ranging from size #4 to #20 ASTM mixed with a binder. The binder and aggregate are then blended together with water to form a slurry capable of being squeegeed (or otherwise placed) over the pavers 12, allowing the slurry to fall into the open joints to form the permeable joint 18. The slurry does not remain on the top surface 14 of the paver 12 but instead flows into the joint void between pavers. Any slurry that is on the top surface 14 of the paver 12 is squeegeed or manipulated into the void or otherwise removed from the top surface.

In the preferred embodiment, the base layer 20 fills the void up to about ¼-inch to 1/32-inch from the top surface 14 of the paver 12. In other words, the base layer 20 fills most but not all of the void, leaving a small amount of void above the base layer as measured from the top surface 14 of the paver 12. Once the base layer 20 is cured, the void is filled with a permeable joint 18 that has a most preferred strength of about 2800 psi.

The second component of the permeable joint 18 is a membrane layer 22 that is less permeable than the base layer 20. The membrane layer 22 is thin and serves as both a fine filter and an aesthetic layer. The membrane layer 22 is preferably formed by a fine sand or aggregate (herein aggregate), a non-cement binder, and water, where the aggregate preferably ranges from size #20 to #50 ASTM. The base layer 20 is preferably cured for at least about 2-hours, which gives the base epoxy binder some time to gel, however depending on the ambient temperature, the cure time could be from about at least 30-minutes on a hot day to 2 or more hours on a cold day. Once the base layer 20 is cured, the membrane layer 22 is blended to form a slurry that can be applied over the base layer 20 in the same manner that the base layer was applied. As with the base layer 20, the membrane layer 22 falls into the open joints between the pavers 12 and onto the base layer 20. To the extent that the slurry is poured over the pavers 12, the membrane layer 22 does not remain on the top surface 14 of the pavers but instead flows into the joint. To the extent that the membrane layer 22 is poured over the top surface 14, it is squeegeed or manipulated into the void or otherwise removed from the top surface 14 of the paver 12. While FIG. 1 shows the membrane layer 22 recessed from the top surface 14 of the paver, it is contemplated that the membrane layer 22 may be flush with or even slightly raised from the top surface 14 of the paver.

The membrane layer 22 may range in a preferred thickness of about slightly-greater-than 0 to ¼-inch to fill the remainder of the joint void between the base layer 20 and the paved surface of the paver 14. In this preferred embodiment, the membrane layer 22 will form an approximately 3500 psi permeable surface when it is cured. This is due to its small aggregate size, which will stop most organic debris from penetrating into the base layer 20 and plugging the paver structural system 10. This preferred membrane layer 22 can be cleaned with stiff bristled brushes or mechanical sweepers, among other methods.

The larger aggregates of the base layer 20 allow for higher liquid flow rates though the membrane layer 22 and therefore the entire system 10. The faster flow rates provided by the base layer 20 mixture using aggregates sized from #4 thru #20 ASTM allows the flow of liquid to easily and quickly move into the base layer 20 and away from the membrane layer 22. Testing shows that utilizing this paver structural system 10 of a thin membrane layer 22 over the base layer 20, permeability rates can be achieved that are 25% to 400% greater than a joint filled entirely with the mixture used to form only the membrane layer 22 that uses aggregate sized in the range of #20 to #50 ASTM.

Additionally, the system 10 will not easily clog from very fine particles, such as dust. Since the membrane layer 22 is a thin layer, fine particles tend to wash through the membrane layer into the base layer 20 and through the system 10 down into the substrate 24. In prior art permeable joints filled entirely with the smaller aggregates (as sized for the membrane layer 22), fine debris such as dust will can tend to clog the permeable joint over time.

The thickness of the permeable joint 18 can vary, depending on the particular configuration of the paver structural system 10, and in particular on the thickness of the paver 12. However, in all embodiments it is contemplated that the membrane layer 22 is thinner than the base layer 20. In a preferred embodiment, the membrane layer 22 is less than a quarter the thickness of the base layer 20.

It should be appreciated that the aggregates that are used in the base layer 20 and membrane layer 22 can be of various materials such as glass, plastic or other materials, and may further be of any color available in the appropriate gradations. Color may also be added to the base layer 20 or the membrane layer 22 by adding appropriate dye to the matrix. It is contemplated that the base layer 20 is a natural color, and that a desired color or material can be used for the membrane layer 22.

The non-cement binder that is preferably used in both the base layer 20 and the membrane layer 22 is a permeable particle binder with an advanced two-part permeable epoxy binding agent that is designed to bind aggregate together into a permeable, breathable and commercially-tough matrix. The binder has a foaming agent that when mixed with water, gives the binder properties to form open pours and allow the aggregates to move freely with each other until gelling. This allows the slurry to easily fill voids such as the joint width with the base layer 20, or to fill the top surface voids when using small aggregate as the membrane layer 22.

It is contemplated that the permeable joint 18 may be sold as a kit of components that includes some or all of the base layer 20 components and the membrane layer 22 components that can be mixed by the user in situ.

When the binder is properly installed in conjunction with the preferred sized aggregates, it creates a pervious joint 18. By capturing runoff and allowing it to seep through the paver structural system 10 through the permeable joint 18 and into the ground, this system can be instrumental in recharging groundwater, reducing storm-water runoff, and meeting the U. S Environmental Protective Agency (EPA) storm-water regulations.

Experiment 1

A sample of permeable joint 18 was tested for strength using a compression testing machine and a flowrate apparatus. The base layer 18 was formed using the preferred aggregates. Twelve 2-inch×2-inch cubes were subjected to compression loading at a 1-day cure, a 3-day cure, and a 7-day cure. The resulting compressive strengths for the base layer 18 ranges from 700-1000 psi at 1-day cure; 1300-1800 psi for 3-day cure; and 2300-2600 psi for 7-day cure. A subsequent sample of permeable joint 18 was tested and a 7-day cure strength of about 2800 psi was found, and higher strengths may be obtained such as up to 3500 psi.

Experiment 2

To test the permeability of the permeable joint 18, samples of the paver structural system 10 measuring one square-foot were placed on a permeability measuring apparatus. The samples were made up of multiple 1½-inch thick non-permeable concrete pavers 12 that were spaced from each other an average of ⅜-inch, creating the permeable joint 18 between the pavers. The surface area of the permeable joints 18 in these samples represented approximately 10 to 15% of the surface area of the samples. The permeable joints 18 in the samples had the preferred base layer 20 and the preferred membrane layer 22. A constant flow of water was applied to the samples to maintain a ½-inch head pressure, or thickness of water above the sample. The water was collected, timed, and weighed to calculate gallons per square foot per minute of water flow through the sample. Six samples resulted in an average permeability rate of 5.766 gal/sqft/min. From experimentation, it was found that a preferred range of permeability rates is in the range of 0.45 to 6.0 gal/sqft/min, and a more preferred range of permeability rates is in the range of 0.50 to 1.0 gal/sqft/min.

Experiment 3

To test the filtration capability of the membrane layer 22 and how well the permeable joint 18 can be rejuvenated after clogging, four samples of the preferred base layer 20 and the preferred membrane layer 22 were tested in an unclogged state to establish a baseline, and then the four samples were tested in a clogged state with: 1) fine sand; 2) sludge (1 part motor oil, 1 part dirt); 3) organic soil and roots; and 4) very fine dust and debris.

The samples were placed in the permeability apparatus and a constant ½-inch head was applied to the samples. Flowrate measurements in gal/sqft/min were taken at 0 minutes, 3 minutes, 5 minutes, and 10 minutes. The samples were then cleaned to rejuvenate the membrane layer 22 so that the rejuvenated flowrates could be determined.

TABLE 1

| | Baseline gal/sqft/min | Clogged gal/sqft/min | % Clogged | Cleaned gal/sqft/min | % Clogged Cleaned |
|---|---|---|---|---|---|
| 1) Fine sand | 5.050 | 3.630 | 28.12% | 4.9 | 3.0% |
| 2) Motor oil and dirt | 6.065 | 3.340 | 44.93% | 4.05 | 33.22% |
| 3) Organic roots and soil | 6.685 | 4.950 | 25.95% | 6.54 | 2.17% |
| 4) Fine dust and debris | 5.655 | 3.000 | 46.95% | 4.18 | 20.8% |

Once the membrane layer 22 was cleaned and rejuvenated, it was found that the permeable joint 18 can be refreshed up to 98% rejuvenated under conditions of fine sand and organic soil clogging, and up to 66% rejuvenated under the most extreme circumstances of motor oil sludge clogging.

It should be appreciated that the characteristics of the paver structural system 10 and the permeable joint 18 itself, including the strength and permeability of the system and the joint, are variable depending on the overall design and the desired strength and permeability parameters of the paved surface 16. In this respect, the experiments 1-3 are illustrative of one preferred system 10 and permeable joint 18. It should be appreciated that other ranges of strength and permeability can be obtained using the present system, method and permeable joint to meet differing design specifications.

While preferred embodiments of the disclosure have been herein illustrated and described, it is to be appreciated that certain changes, rearrangements and modifications may be made therein without departing from the scope of the disclosure as defined by the appended claims.

What is claimed is:

1. A paver structural system having a permeable joint, the system comprising:

at least two pavers partially defining a paved surface of the paver structural system, the at least two pavers partially defining a void therebetween;

a permeable joint located substantially only in the void between the at least two pavers, wherein the permeable joint also partially defines the paved surface, the permeable joint comprising:

a base layer formed of aggregate and bonded together with a non-cement binder; and a membrane layer formed of aggregate that is sized smaller than the aggregate of the base layer, wherein the aggregate of the membrane is also bonded together with a non-cement binder, wherein the membrane layer is less permeable than the base layer, and wherein the membrane layer is located above the base layer;

wherein the membrane layer has a thickness in the range greater-than 0 to ¼-inch to fill the void between the base layer and a top surface defined by the at least two pavers.

2. The paving system of claim 1, wherein the non-cement binder of the base layer is the same non-cement binder of the membrane layer.

3. The paving system of claim 1, wherein the aggregate size of the base layer is in the range of #4 to #20 ASTM.

4. The paving system of claim 1, wherein the aggregate size of the membrane layer is in the range of #20 to #50 ASTM.

5. The paving system of claim 1, wherein the membrane layer is disposed in the void between the at least two pavers and is not disposed on a top surface of the at least two pavers.

6. The paving system of claim 1, wherein the base layer has a compressive strength in the range of 2300 to 2800 psi for a 7-day cure.

7. The paving system of claim 1, wherein the system has a permeability in the range of 0.45 to 6.0 gal/sqft/min.

8. The paving system of claim 7, wherein the system has a permeability in the range of 0.50 to 1.0 gal/sqft/min.

9. A method of placing the paver structural system having a permeable joint, the system comprising:

laying at least two pavers on a substrate layer;

spacing the at least two pavers from each other in a spaced arrangement forming joint voids therebetween;

forming a first slurry containing aggregate, water and a non-cement binder to form the base layer;

applying the base layer of the permeable joint over the paver structural system, and placing the base layer substantially only into the joint voids;

curing the base layer for at least 30-minutes;

forming a second slurry containing aggregate, water and a non-cement binder to form the membrane layer, wherein the aggregate of the second slurry is smaller than the aggregate of the first slurry; and applying the membrane layer of the permeable joint over the paver structural system, placing the membrane layer into the joint voids and on top of the base layer, and depositing the membrane layer to have a thickness in the range greater-than 0 to ¼-inch to fill the void between the base layer and a top surface defined by the at least two pavers.

10. The method of claim 9, wherein the pavers are preferably spaced from about ⅜-inch to ⅝-inch apart from each other.

11. The method of claim 9, wherein the pavers are placed into the substrate layer from about ¼-inch to ⅜-inch depth.

12. The method of claim 9, wherein the base layer is squeegeed into the joint voids.

13. The method of claim 9, wherein the base layer fills the joint void up in the range of about ¼-inch below a top surface of the pavers to 1/32-inch from the top surface of the pavers.

14. The method of claim 9, wherein the membrane layer is squeegeed into the joint voids.

15. The method of claim 9, wherein the non-cement binder of the base layer is a two-part permeable epoxy binder having a foaming agent.

16. The method of claim 9, wherein the non-cement binder of the membrane layer is a two-part permeable epoxy binder having a foaming agent.

17. The method of claim 16, wherein the non-cement binder of the membrane layer is the same non-cement binder of the base layer.

18. A permeable joint for a paver structural system having individual pavers that form a paved surface, the permeable joint comprising:

a base layer comprising aggregate sized in the range of #4 to #20 ASTM and a two-part permeable epoxy binder having a foaming agent; and a membrane layer comprising aggregate sized in the range of #20 to #50 ASTM and the two-part permeable epoxy binder having the foaming agent;

wherein the base layer is mixed into a slurry with water and deposited between substantially only between the individual pavers; and wherein the membrane layer is mixed into a second slurry with water and deposited between the individual pavers and above the base layer, wherein the membrane member has a thickness in the range greater-than 0 to ¼-inch to fill the void between the base layer and a top surface defined by the at least two pavers.

19. The permeable joint of claim 18, wherein the permeable joint has a permeability in the range of 0.45 to 6.0 gal/sqft/min where the permeable joint constitute in the range of 10% to 15% of the paved surface.

* * * * *